US009873517B2

(12) United States Patent
MacLean et al.

(10) Patent No.: US 9,873,517 B2
(45) Date of Patent: Jan. 23, 2018

(54) DE-ICING SYSTEM AND METHOD

(71) Applicant: Leonardo MW Ltd, Basildon (GB)

(72) Inventors: John Ronald MacLean, Basildon (GB); Douglas Stuart Maguire, Basildon (GB); Jack Paterson, Basildon (GB); Steven Lawson, Basildon (GB)

(73) Assignee: LEONARDO MW LTD, Basildon, Essex (GB)

( * ) Notice: Subject to any disclaimer, the term of this patent is extended or adjusted under 35 U.S.C. 154(b) by 0 days.

(21) Appl. No.: 14/427,505

(22) PCT Filed: Aug. 15, 2013

(86) PCT No.: PCT/EP2013/067084
§ 371 (c)(1),
(2) Date: Mar. 11, 2015

(87) PCT Pub. No.: WO2014/040819
PCT Pub. Date: Mar. 20, 2014

(65) Prior Publication Data
US 2015/0232186 A1    Aug. 20, 2015

(30) Foreign Application Priority Data

Sep. 11, 2012   (GB) .................... 1216205.3

(51) Int. Cl.
*B08B 3/12*    (2006.01)
*B64D 15/16*   (2006.01)

(52) U.S. Cl.
CPC .................... B64D 15/16 (2013.01)

(58) Field of Classification Search
None
See application file for complete search history.

(56) References Cited

U.S. PATENT DOCUMENTS

| 4,829,162 A | 5/1989 | Soloski et al. |
| 5,191,791 A * | 3/1993 | Gerardi .................. B64D 15/16 73/178 R |

(Continued)

FOREIGN PATENT DOCUMENTS

| DE | 10 2004 060 675 A1 | 6/2006 |
| EP | 2 386 750 A1 | 11/2011 |

(Continued)

OTHER PUBLICATIONS

Adiga et al, Temperature dependence of mechanical stiffness and dissipation in ultrananocrystalline diamond, May 28, 2009, SPIE, 11 pages including cover and abstract.*

(Continued)

*Primary Examiner* — Binh X Tran
*Assistant Examiner* — David Cathey, Jr.
(74) *Attorney, Agent, or Firm* — Buchanan Ingersoll & Rooney PC

(57) ABSTRACT

A de-icing system for a hemispherical protective housing mounted on an aircraft structure is described. The system can include a series of piezo-electric devices mounted at the boundary of the housing. The piezo-electric devices generate ultrasonic frequencies and resonance of the protective housing is induced. One of the piezo-electric devices senses the frequency generated in the protective housing and acts as part of a feedback loop to maintain structural resonance of the protective housing. The structural resonance of the protective housing prevents the build-up of ice. Additionally, higher power resonances can be generated to remove ice already built up on the protective housing. The system also enables detection of ice build-up on the protective housing by monitoring any change in the frequency required to maintain structural resonance of the protective housing.

15 Claims, 1 Drawing Sheet

(56) References Cited

U.S. PATENT DOCUMENTS

Figure 1:
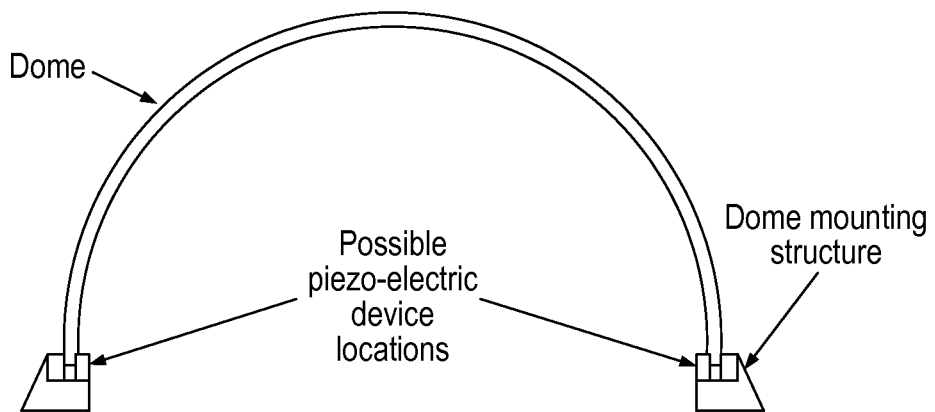

| | | | |
|---|---|---|---|
| 5,928,300 A * | 7/1999 | Rogers | B60R 21/0132 180/268 |
| 8,217,554 B2 * | 7/2012 | Royer, Jr. | B64D 15/00 244/134 A |
| 2005/0103927 A1 | 5/2005 | Barre et al. | |
| 2008/0118759 A1 * | 5/2008 | Korpi | C22C 45/10 428/457 |
| 2010/0031972 A1 | 2/2010 | Royer, Jr. et al. | |
| 2011/0280723 A1 | 11/2011 | Libergren | |
| 2012/0074262 A1 | 3/2012 | Chue et al. | |
| 2013/0032671 A1 * | 2/2013 | Giles | B64D 15/16 244/134 R |
| 2016/0023772 A1 * | 1/2016 | Borigo | B64D 15/163 134/1 |

FOREIGN PATENT DOCUMENTS

| | | |
|---|---|---|
| FR | 2 650 667 A1 | 2/1991 |
| JP | 4-113996 A | 4/1992 |
| WO | WO 87/04036 A1 | 7/1987 |

OTHER PUBLICATIONS

The Literary Digest, An Invisible German Aeroplane, Dec. 25, 1915, The Literary Digest, p. 1475.*
Notification Concerning Transmittal of International Preliminary Report on Patentability (PCT/IB/326) dated Mar. 26, 2015, by the European Patent Office as the International Searching Authority for International Application No. PCT/EP2013/067084.
International Search Report (PCT/ISA/210) dated Dec. 11, 2013, by the European Patent Office as the International Searching Authority for International Application No. PCT/EP2013/067084.
Written Opinion (PCT/ISA/237) dated Dec. 11, 2013, by the European Patent Office as the International Searching Authority for International Application No. PCT/EP2013/067084.
Great Britain Search Report dated Jan. 23, 2013 for Application No. GB1216205.3.

* cited by examiner

DE-ICING SYSTEM AND METHOD

This invention relates to a de-icing system and method. More specifically, but not exclusively, it relates to a system and method for detecting and removing ice build-up on a domed protective housing mounted on an aircraft.

In modern aircraft, sensitive monitoring equipment, such as infrared (IR) cameras and laser 'pointers' are often mounted on the exterior of the aircraft. Such equipment must be protected from the harsh exterior environment and this is often achieved by use of transparent domed structures that do not inhibit the 'view' from such cameras or the transmission of the laser. However, ice and moisture can build-up on such protective domed housings at altitude thereby inhibiting the view for the camera and the transmission of the laser.

Accordingly, there is a requirement for a system to detect and remove ice and moisture from a domed transparent housing that does not impair the transmissivity of the structure itself.

Commercially available systems exist for removing ice from aircraft wing leading edges. Generally, these use wide-band electro-mechanical vibrations induced by a pulsed electro-magnet embedded into the aircraft wing. Such a device is disclosed in U.S. Pat. No. 6,102,333. The electro-mechanical de-icer described in this document uses electro-magnets that require a compliant surface that can deform sufficiently to remove ice-build-up. Additionally, such a system does not independently detect the presence of ice; it assumes the presence of ice and acts to remove it accordingly.

A further system is described in US Patent 2012/0074262 entitled "DE-ICING SYSTEM FOR A FIXED OR ROTARY AIRCRAFT WING". The system disclosed therein includes the use of ultrasonic vibration induced by piezo-electric actuators to remove ice build-up from the wings of rotary or fixed wing aircraft. However, the system as described cannot be used to detect the presence of ice.

Furthermore, the surface of the dome cannot be obscured, for example by heating filaments embedded in the structure as this would block the laser/IR camera. Additionally, electro-thermal de-icing at the base of the dome is also not possible as this method requires excessive electrical power to maintain temperatures above the external dew point to prevent moisture settling, or to melt ice on the surface.

According to the present invention there is provided a de-icing system for a protective housing mounted on fixed or rotary wing aircraft, the system comprising means for generating ultrasonic frequencies in the housing and means for sensing the ultrasonic frequencies induced in the housing, an ultrasound frequency range being predetermined and selected such that structural resonance of the housing is induced by the generating means, the means for sensing ultrasonic frequencies comprising means for maintaining the ultrasound frequency such that structural resonance of the housing is maintained and thereby causes the breakdown of ice existing on the housing and prevents build-up of additional ice on the housing.

According to the invention there is further provided a method of de-icing a protective housing forming part of the exterior of an aircraft comprising the steps of generating ultrasonic frequencies in the protective housing; monitoring the frequency induced in the housing; and adjusting the induced frequency until structural resonance of the housing is achieved.

The present invention provides a solution that maintains a complex curved structure free from ice and moisture whilst maintaining the transparent nature of the structure. Additionally, the present invention enables detection of ice build-up as well as ice removal.

Figure 2:
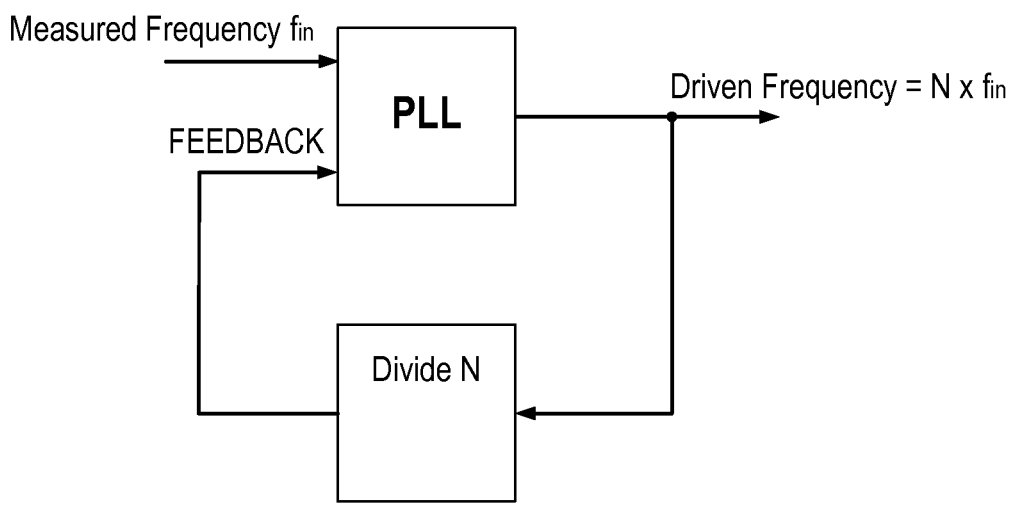

The invention will now be described with reference to the following diagrammatic drawings in which:

FIG. 1 is a cross-sectional diagrammatic drawing of a system in accordance with one form of the invention where a series of piezo-electric devices are mounted at the boundary 2 of a protective housing 2, the housing 1 being, for example a dome; and FIG. 2 is a circuit diagram showing a phase locked loop for measuring frequency vibrations sensed by at least one of the piezo-electric devices of FIG. 1 and the output to further piezo-electric devices generating the ultrasonic frequencies required to induce structural resonance in the housing.

The de-icing system in one form of the invention comprises a series of piezo-electric actuators positioned at the base (equator) 2 of a hemi-spherical dome surface 1. Several of the piezo-electric actuators are used to induce vibrations in the ultrasonic frequency range (20 kHz-200 kHz), while one sensing piezo-electric device is used to measure the frequency of vibration of the dome 1 by measuring the induced displacements of the dome surface at its base. The vibrations measured by the sensing piezo-electric device are used to lock the other driving piezo-electric actuators into a high amplitude resonance, inducing structural resonance of the dome.

Structural resonance is continually induced to inhibit ice build-up. Higher power resonances may be further induced by the piezo-electric actuators to remove existing ice build-up.

The frequency of the induced structural resonance measured by the sensing piezo-electric device can be used to indicate that the structural character of the dome surface has changed, thereby suggesting the presence of ice build-up. This change may be used to automate the system, ensuring it is only in use when required by the external environment.

It has been found that high frequency vibrations are required to generate a sufficiently high surface acceleration, such that ice delaminates from the surface of the dome and falls off. These same surface accelerations also prevent ice from building up on the surface, and can prevent moisture from settling on the surface. frequencies over 24 kHz, stable resonances in hemispherical domed sapphire structures were found to prevent ice build-up, remove ice build-up and detect ice in the manner described above.

However, strong structural resonances of 23 kHz, 44 kHz, 75 kHz and 93 kHz may be used in the specific structure described and achieve the above results. In this manner it can be shown that different frequencies or ranges of frequencies of resonance may be used to achieve the desired results and the invention is not limited to the use of the frequencies described above.

The exact frequency position of each resonance may be over a relatively narrow band. For example at the 44 kHz resonance, the peak of the resonance was at 44.2 kHz, started at about 44.15 kHz, and tailed off at about 44.35 kHz). This indicates that the proposed system may be termed a high-Q system—a very efficient means of energy transfer.

The amount of energy the piezo-electric actuators and device required is around 10 W to remove ice/prevent ice build-up—much less than for some form of heating system.

Additionally, it is possible to measure the vibrations in the dome 1 using a high frequency microphone instead of a piezo-electric device. However, it should be noted that use of a piezo-electric device enables resonance to be detected, and can therefore be used to drive the other piezo-devices inducing the vibration towards a resonance, thereby making the system self-resonating.

In this way, the de-icing system and method induces the excitation of structural resonances of a hemi-spherical domed structure in the ultrasonic frequency range to inhibit ice build-up, delaminate ice build-up, detect the frequency of ultrasonic structural resonances for these purposes, and to determine the presence of ice build-up on the dome 1 surface from the frequencies detected.

Whilst the embodiment above relates to a hemispherical sapphire dome 1, it will be appreciated that structural resonance can be induced in any structure, even a flat plate, providing the boundaries 2 of the structure are fixed in position and it is free to move between those boundaries 2.

The invention claimed is:

1. A de-icing system for a transparent protective housing to be mounted or fixed on a rotary wing aircraft, the system comprising:
   means for generating around 10W of ultrasonic frequencies in the transparent protective housing; and
   means for sensing the ultrasonic frequencies induced in the transparent protective housing, the sensing means being configured to operate in a predetermined ultrasonic frequency range such that structural resonance of the transparent protective housing is induced by the generating means when an ambient temperature allows for ice accumulation on the transparent protective housing, the sensing means including means for maintaining the ultrasound frequency such that structural resonance of the transparent protective housing will be maintained and thereby cause breakdown of ice existing on the housing and prevent build-up of additional ice on the transparent protective housing, and the sensing means including at least one piezo-electric device mounted on a boundary of the transparent protective housing for arrangement adjacent an aircraft structure, the at least one piezo-electric device detecting any change in the frequency required to maintain structural resonance of the transparent protective housing, wherein said frequency change is indicative of ice build-up on the transparent protective housing.

2. A de-icing system according to claim 1 in which the means for generating ultrasound frequencies comprises:
   a series of piezo-electric actuators mounted on boundaries of the transparent protective housing for arrangement adjacent an aircraft structure.

3. A de-icing system according to claim 1 in which the means for sensing ultrasound frequencies is configured to output a signal to a phase locked loop, the phase locked loop acting to drive a vibration of the transparent protective housing towards resonance and to maintain structural resonance of the protective housing.

4. A de-icing system according to claim 1 in which the means for generating and the means for sensing form part of a mounting system for mounting the transparent protective housing to an aircraft structure.

5. A de-icing system according to claim 1 in which the piezo-electric devices can either be bending or shear actuators, depending on their mounting location on the transparent protective housing and a particular resonance mode induced.

6. A method of de-icing a transparent protective housing forming part of an exterior of an aircraft, the method comprising:
   generating around 10 W of ultrasonic frequencies in the transparent protective housing and when an ambient temperature allows for ice accumulation on the housing;
   monitoring a frequency induced in the transparent protective housing via at least one piezo-electric device mounted on a boundary of the transparent protective housing for arrangement adjacent an aircraft structure;
   identifying any change in the frequency required to maintain structural resonance of the transparent housing as an indication of ice build-up on the transparent protective housing; and
   adjusting the induced frequency until structural resonance of the transparent housing is achieved.

7. A method of de-icing according to claim 6 comprising:
   continually monitoring the induced frequency in the transparent protective housing such that structural resonance is maintained; and
   inducing higher power resonances to remove ice build-up as desired.

8. A de-icing system according to claim 1 in which the transparent protective housing comprises:
   a substantially hemispherical dome formed from sapphire.

9. A de-icing system according to claim 1 in which the means for generating ultrasound frequencies comprises:
   a series of piezo-electric actuators mounted on boundaries of the transparent protective housing for arrangement adjacent an aircraft structure.

10. A de-icing system according to claim 1 in which the means for sensing ultrasound frequencies comprises:
    at least one piezo-electric device mounted on a boundary of the transparent protective housing for arrangement adjacent an aircraft structure.

11. A de-icing system according to claim 10 in which the means for sensing ultrasound frequencies is configured to output a signal to a phase locked loop, the phase locked loop acting to drive a vibration of the housing towards resonance and to maintain structural resonance of the transparent protective housing.

12. A de-icing system according to claim 11 in which the means for generating and the means for sensing form part of a mounting system for mounting the transparent protective housing to an aircraft structure.

13. A de-icing system according to claim 12 in which the piezo-electric devices can either be bending or shear actuators, depending on their mounting location on the transparent protective housing and a particular resonance mode induced.

14. A de-icing system according to claim 13 in which the transparent protective housing comprises:
    a substantially hemispherical dome formed from sapphire.

15. A de-icing system for a transparent protective housing to be mounted on a fixed wing aircraft, the system comprising:
    means for generating around 10 W of ultrasonic frequencies in the transparent protective housing; and
    means for sensing the ultrasonic frequencies induced in the transparent protective housing, the sensing means being configured to operate in a predetermined ultrasonic frequency range such that structural resonance of the transparent protective housing is induced by the generating means when an ambient temperature allows for ice accumulation on the transparent protective housing, the sensing means including means for maintaining the ultrasound frequency such that structural resonance of the transparent protective housing will be maintained and thereby cause breakdown of ice existing on the housing and prevent build-up of additional ice on the transparent protective housing, and the sensing means including at least one piezo-electric device mounted on a boundary of the transparent protective housing for arrangement adjacent an aircraft structure, the at least one piezo-electric device detecting any change in the frequency required to maintain structural resonance of the transparent protective housing, wherein said frequency change is indicative of ice build-up on the transparent protective housing.

* * * * *